United States Patent [19]
Jeon

[11] Patent Number: 6,122,734
[45] Date of Patent: Sep. 19, 2000

[54] BOOTABLE CD-ROM DISK AND A SYSTEM FOR MANUFACTURING BOOTABLE CD-ROM DISKS WITH RECORDED OPERATING SYSTEM PROGRAMS AND APPLICATION PROGRAMS

[75] Inventor: Young-Il Jeon, Suwon, Rep. of Korea

[73] Assignee: SamSung Electronics Co., Ltd., Suwon, Rep. of Korea

[21] Appl. No.: 08/997,617

[22] Filed: Dec. 23, 1997

[30] Foreign Application Priority Data

Dec. 23, 1996 [KR] Rep. of Korea ............... 96-70215

[51] Int. Cl.$^7$ ............................................. G06F 9/445
[52] U.S. Cl. ............................................................ 713/2
[58] Field of Search ................................ 713/2, 1, 100

[56] References Cited

U.S. PATENT DOCUMENTS

| | | | |
|---|---|---|---|
| 5,692,190 | 11/1997 | Williams | 713/2 |
| 5,715,456 | 2/1998 | Bennett et al. | 713/2 |
| 5,727,213 | 3/1998 | Kamp et al. | 709/301 |
| 5,802,363 | 9/1998 | Williams et al. | 713/2 |
| 5,951,684 | 9/1999 | Jeon | 713/1 |

*Primary Examiner*—Dennis M. Butler
*Attorney, Agent, or Firm*—Robert I. Bushnell, Esq.

[57] ABSTRACT

A bootable CD-ROM disk manufacturing system includes a data source for providing data files to be recorded in a CD-ROM disk; a floppy disk for providing an operating system for a booting process and programs to be executed with booting process; a computer for producing one master file by arranging the data files, the operating system and the programs to be executed with booting process; a master hard disk for storing the master file; and a CD-ROM disk recorder for recording the master file in the CD-ROM disk under control of the computer.

19 Claims, 4 Drawing Sheets

A: Unused area, B: Definitions of descriptor
C: Area which can be omitted, D: Directory information
E: Directories & files

BOOTABLE CD-ROM DISK AND A SYSTEM FOR MANUFACTURING BOOTABLE CD-ROM DISKS WITH RECORDED OPERATING SYSTEM PROGRAMS AND APPLICATION PROGRAMS

CLAIM FOR PRIORITY

This application makes reference to, incorporates the same herein, and claims all benefits accruing under 35 U.S.C. §119 from an application for A BOOTABLE DATA CD-ROM DISK, A SYSTEM FOR MANUFACTURING THE SAME AND A MANUFACTURING METHOD THEREOF earlier filed in the Korean Industrial Property Office on the $23^{rd}$ of December 1996, and there duly assigned Ser. No. 70215/1996, a copy of which application is annexed hereto.

BACKGROUND OF THE INVENTION

1. Technical Field

The present invention relates to a bootable compact disk read-only-memory (CD-ROM) disk with recorded operating system programs and application programs, and a system for manufacturing bootable CD-ROM disks, in which the CD-ROM disks are recorded with not only an operating system program for booting a computer system but also general application programs and data files for specific applications.

2. Related Art

All computer systems including personal computers (PCs) execute operating system programs such as MS-DOS (disk operating system) and WINDOWS to instruct the computer systems on how to use other application specific programs such as word processing and spreadsheet programs. An operating system program such as MS-DOS must be loaded to the computer's working memory which is ordinarily a random-access-memory (RAM) by a process known as "booting."

Booting occurs automatically when the computer is first turned on, a process called a "cold boot," or by the user while the computer is running, a process called "warm boot." Booting performs two functions controlled by firmware stored in one or more basic input-output system, or BIOS, chips inside the computer. The first function of "booting" is to run a power-on self-test, or POST. The second function of "booting" is to search the storage media for the operating system it will load to the computer's working memory. The usual types of storage media for "booting" purposes are external floppy disk and internal hard disk which are magnetic media and other internal memory devices as disclosed, for example, in U.S. Pat. No. 5,274,816 for Personal Computer Capable Of Changing Boot Priority issued to Oka, U.S. Pat. No. 5,307,497 for Disk Operating System Loadable From Read Only Memory Using Installable File System Interface issued to Feigenbaum et al., U.S. Pat. No. 5,325,532 for Automatic Development Of Operating System Boot Image issued to Crosswy et al., U.S. Pat. No. 5,473,775 for Personal Computer Using Flash Memory As BIOS-ROM issued to Sakai et al., U.S. Pat. No. 5,519,843 for Flash Memory System Providing Both BIOS And User Storage Capability issued to Moran et al., and U.S. Pat. No. 5,522,076 for Computer System Having BIOS (Basic Input/Output System)-ROM (Read Only Memory) Writing Function issued to Dewa et al. Nowadays, as a CD-ROM disk drive is generally used for most computer systems, a CD-ROM disk which has attributes of both hard disks and floppy diskettes for storing the operating system has developed for "booting" purposes. The CD-ROM disk of this type is called as a "bootable CD-ROM disk" as described, for example, in U.S. Pat. No. 5,418,918 for Scanning Initial CD-ROM Sectors For A Boot Record And Executing Said Boot Record To Load And Execute Floppy Disk Image Corresponding To The Existing Floppy Drive issued to Vander Kamp et al., and U.S. Pat. No. 5,652,868 for Data Processor Having BIOS Decrytion Of Emulated Media Images issued to Williams. In particular, U.S. Pat. No. 5,652,868 relates to a structure which makes CD-ROM bootable. Likewise, U.S. Pat. No. 5,418,918 illustrates the making of a new boot image in a system received area. The bootable CD-ROM disk is used to boot the computer when the computer has only a CD-ROM drive without a floppy disk drive, or when the hard disk malfunctions and cannot be used to boot the computer.

A bootable CD-ROM disk is generally used to recover data stored on a damaged hard disk in a computer system. That is, after the computer system is booted with the bootable CD-ROM disk, the user is permitted to format the damaged hard disk and copy data files, such as application programs and various data files, from a separate data CD-ROM to the formatted hard disk. Both the bootable CD-ROM disk and the separate data CD-ROM disk, which is generally called a back-up CD-ROM, are provided to the user to recover the damaged hard disk. Therefore, suppliers must manufacture two separate CD-ROM disks for data recovery purposes, a task that can be burdensome. Moreover, almost all of the free-space of the bootable CD-ROM disk is not utilized. If the bootable CD-ROM disk is not provided to the user, the user has to boot the computer system with a floppy disk having the boot program recorded thereon. After booting, the user can repair the damaged hard disk with a repair program and copy data and files, such as application programs and operating system files, from a separate CD-ROM to the repaired hard disk. In this case, the CD-ROM driving program must be provided in the floppy disk to run the CD-ROM disk drive installed in the computer. Since the CD-ROM driving programs differ from each other according to the existing CD-ROM disk drive, the user must use a suitable CD-ROM driving program for the CD-ROM disk drive. Therefore, a floppy disk or CD-ROM disk having operating system programs recorded thereon for booting the computer as well as a floppy disk having CD-ROM driving programs recorded thereon must be provided to operate the computer system and its CD-ROM disk drive.

The computer system can easily record the application programs and operating system programs on the floppy disk but uses only the operating system program when booting. However, since the CD-ROM disk is recorded only by a specific CD-ROM disk recorder, I have noted that it is difficult to record both the application programs and operating system programs on a CD-ROM disk. I have also found that it is difficult to assign the program area for the application programs and operating system program area on the CD-ROM disk properly. Therefore, CD-ROM disks having both application programs and operating system programs recorded thereon are not currently available.

SUMMARY OF THE INVENTION

Accordingly, it is therefore an object of the present invention to provide a CD-ROM disk manufacturing system which can record not only the data files such as application programs but also operating system programs on a CD-ROM disk.

It is also an object to provide a CD-ROM disk recorded with the data files such as application programs and operating system programs for booting and repairing a computer system.

It is further an object to provide a CD-ROM disk for both booting and repairing a computer system with only the CD-ROM disk.

It is yet another object to provide a manufacturing technique of a bootable data CD-ROM disk.

These and other objects of the present invention can be achieved by a bootable data CD-ROM disk manufacturing system which includes a data source for providing data files to be recorded in a CD-ROM disk; a floppy disk for providing an operating system for a booting process and programs to be executed with the booting process; a computer for producing one master file by arranging the data files, the operating system and the programs to be executed with booting process; a master hard disk for storing the master file; and a CD-ROM disk recorder for recording the master file in the CD-ROM disk under the control of the computer.

A bootable CD-ROM disk is manufactured by a process of making boot catalog information with a validation entry and information for a booting process; making a boot image file by reading a floppy disk recording booting programs; making a tree file by analyzing structures of a directory and data files recorded in a data source; calculating sizes of files in the directory and storing temporarily the sizes in the tree file; determining a logical sector number for path table information of the booting programs, the data files, and the directory; making a system reserved area for a CD-ROM disk; making a descriptor table including a boot record; making a path table according to the path table information; making a master file on a master hard disk with copying the boot image file and the data files according to the directory information of the tree file; and recording the master file on the CD-ROM disk.

A bootable CD-ROM disk is configured with a system reserved area; a descriptor table area including a boot record; a path table area for recording directory information of the CD-ROM disk; a booting catalog area including a validation entry and booting information; a root directory area for recording information regarding files recorded on the CD-ROM disk; a boot image area having a predetermined size and for recording booting programs; and an area for recording application programs and data files.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
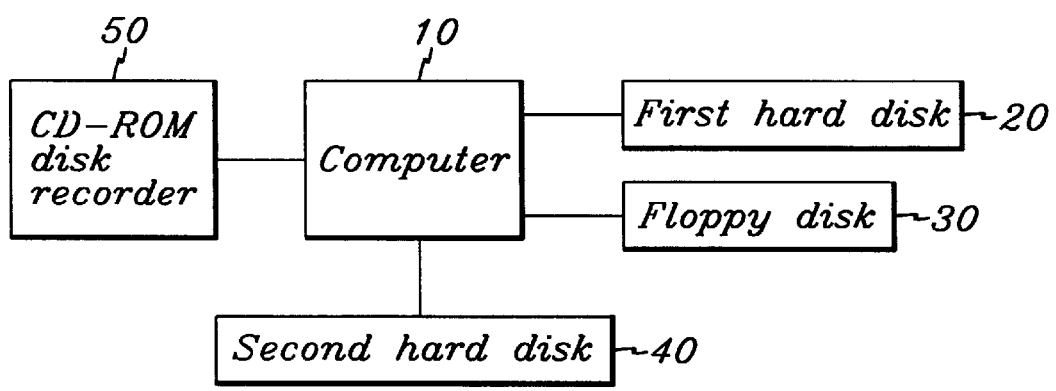
FIG. 1 is a block diagram of a CD-ROM manufacturing system for manufacturing a bootable data CD-ROM disk according to the principles of the present invention.

Referring now to the drawings and particularly to FIG. 1, which illustrates a bootable data CD-ROM manufacturing system constructed according to the principles of the present invention. The bootable CD-ROM manufacturing system includes a first hard disk 20, a floppy disk 30, a second hard disk 40, a CD-ROM disk recorder 50, and a computer 10.

The first hard disk 10 stores the data files to be recorded in a CD-ROM. The data files include various application programs, such as WINDOW'95 and schedule program provided by program suppliers et al. Preferably, the data files are compressed to save the space of the first hard disk 10. The first hard disk 10 is just one example of the memory devices or data file source which can memorize or supply the data files, and can be replaced with other devices, such as a CD-ROM disk or a network device.

The floppy disk 30 stores an operating system program and program which is used for booting the computer. The computer 10 reads the operating system program and data files from the first hard disk 10 and the floppy disk 30, and arranges the operating system program and the data files, and produces a path table recording the order (arrangement) of the operating system program and the data files. Then the computer 10 makes the path table, the operating system program and data files to one master file and records the master file on the second hard disk 40. The second hard disk 40 is called as the master hard disk, and CD-ROM disk recorder 50 which is controlled by the computer 10 reads the master file stored in the second hard disk 40, and writes the master file on a CD-ROM disk in the CD-ROM disk recorder 50.

Figure 2:
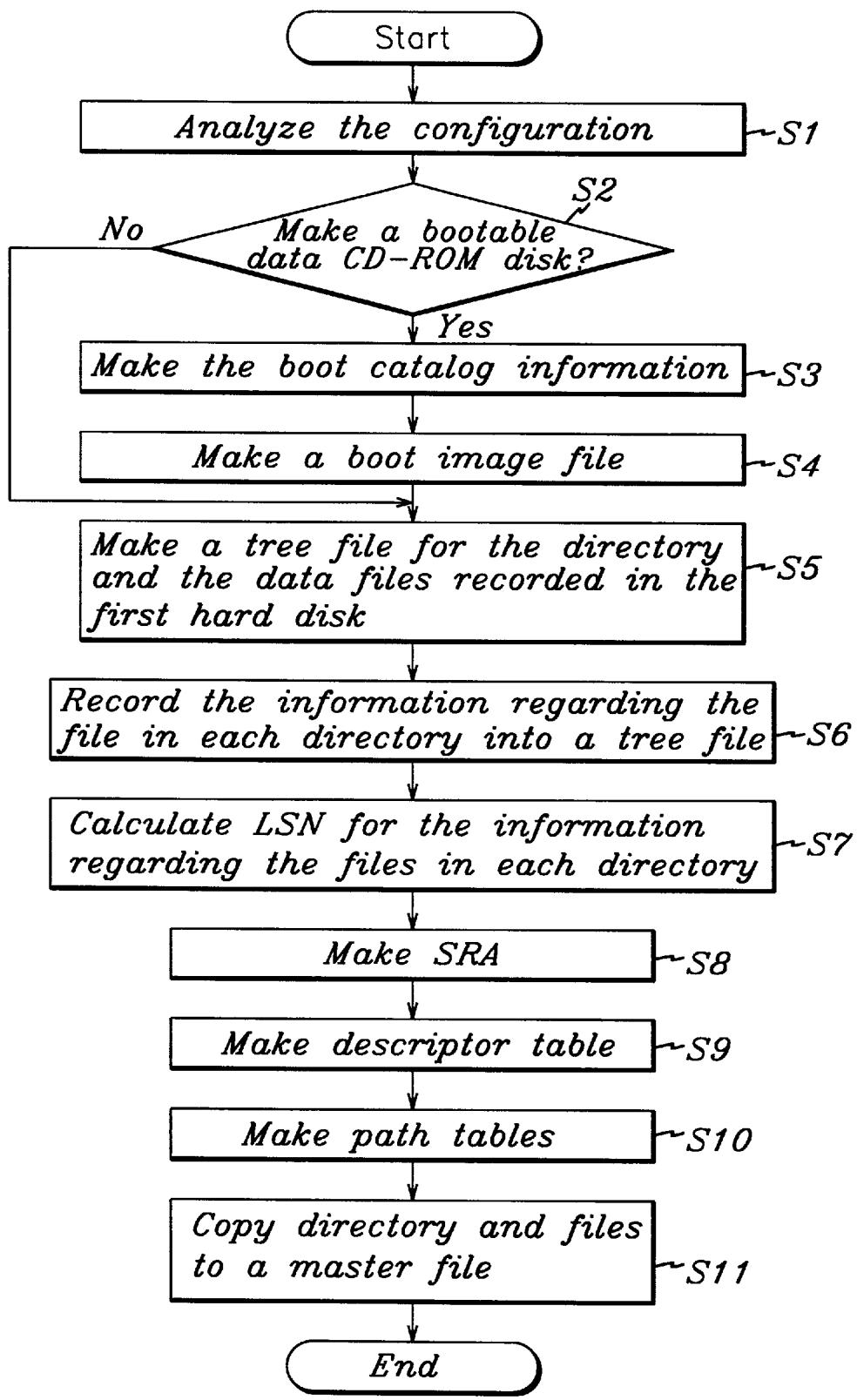
FIG. 2 is a flow chart of a process for manufacturing a bootable data CD-ROM disk by using the CD-ROM disk manufacturing system according to the principles of the present invention.

A method for manufacturing a bootable CD-ROM disk by using the bootable data CD-ROM manufacturing system of the present invention is described in detail with reference to the FIGS. 1 and 2. First, the computer 10 analyzes the configuration file for its operation at step S1. An example of the configuration file is as follows.

BOOT=A:

D:\*.*

RESULT=SAMPLE.RAW

When the configuration file is set as above, the computer 10 reads the contents of the floppy disk 30 in the 'A' drive, and reads the contents of the first hard disk 20 from the 'D' drive for copying the contents to be recorded in the CD-ROM disk. The result is temporarily recorded to the file 'SAMPLE.RAW'. After analyzing the configuration file, the computer 10 determines whether a bootable CD-ROM disk should be made or not at step S2. If the character next to the 'BOOT' is one of 'A' to 'Z', the computer 10 regards that the bootable data CD-ROM is to be made, and if the sentence 'BOOT:=A' does not exist, the computer 10 regards that the conventional data CD-ROM is to be made.

When manufacturing the bootable data CD-ROM disk, the computer system makes the boot catalog information at step S3. The boot catalog information includes the validation entry and information for booting the computer 10. The information includes a type of computers in which the CD-ROM disk can be used, the information regarding the CD-ROM disk developer, the information regarding the boot image file, and the computer system type. The boot image file includes programs memorized on the floppy disk for booting the computer 10. Then the computer 10 reads all the operating system programs from the floppy disk 30 and make the boot image file thereof at step S4. The computer 10 makes the boot image file by automatically identifying a media type (1.2 MB, 1.44 MB) of the floppy disk 30. The size of the boot image area in the CD-ROM disk is predetermined so as to record the boot image file in the CD-ROM disk irrespective of the type of the floppy disk.

Figure 4A:
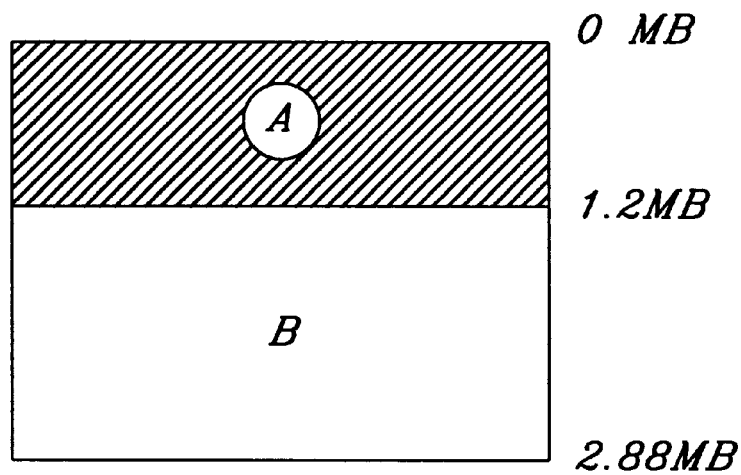
FIGS. 4A and 4B illustrate a booting image area recorded on the CD-ROM disk manufactured under the principles of the present invention.
Figure 4B:
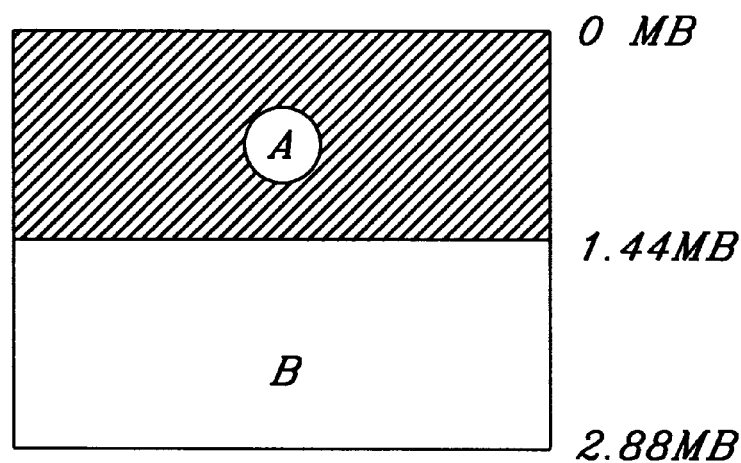

As shown in FIGS. 4A and 4B, the size of a booting image area recorded on the CD-ROM disk is set to 2.88 MB in accordance with the preferred embodiment of the present invention. Therefore, when the size of the floppy disk is 1.2

MB, the empty space is 1.68 MB (FIG. 4A), and when the size of the floppy disk 30 is 1.44 MB, the empty space is 1.44 MB (FIG. 4B). The parts 'A' of FIGS. 4A and 4B represent the parts of the boot image area containing the boot image file, and the parts 'B' of FIGS. 4A and 4B represent empty boot image. Therefore, the computer system can easily identify the boot image area and the data area by separating the booting image area and the data area of the CD-ROM disk.

Then the computer 10 makes the tree file by analyzing the structures of the directory and the data files recorded in the first hard disk 20 at step S5. That is, by analyzing the data in the first hard disk 20, the computer 10 determines the directory structure of the data files and arranges the same in an alphabetic order optionally. The arranged directory information is temporarily stored in a memory of the computer 10. Then, the file size of each directory is calculated and is recorded in the tree file with the arranged directory information at step S6. The sizes and the numbers of the files in each directory can also be stored in the tree file.

Then the computer 10 calculates the logical sector numbers (LSN) of the CD-ROM at which the information (path table) of the operating system programs, data files and directory structure are located at step S7. Namely, after calculating the size of the path table, the number of directory, and the directory information, the LSN is determined to set the structure of the file to be stored in the CD-ROM. Therefore, the data structure of the CD-ROM is determined as shown in FIG. 3.

Next, the computer 10 makes a system reserved area (SRA) on the CD-ROM disk at step S8. The system reserved area (SRA) comprises 16 LSN of 2048 bites, and has the value of "00". The next step is to make the descriptor table of the CD-ROM disk at step S9. The descriptor table includes a primary volume descriptor (PVD), a boot record and a terminator. The information regarding the memory size of the CD-ROM disk, the system supplier, and the LSN of the path table and system identification number are recorded in the primary volume descriptor (PVD) in Intel format and Motorola format. The boot record identifies the DOS system of the CD-ROM disk and loads the DOS to the computer system. And, the terminator is for marking the end of the volume descriptor. Then the computer 10 makes path tables with reference to the directory information. The path tables consist of the Intel type path table (I PATH) and the Motorola type path table (M PATH). The path tables includes information regarding the directory of the CD-ROM disk to speed up the search of the CD-ROM. The directory information is derived from steps S5 and S6.

Then the computer system 10 copies directory and files (DIR ENTRY & FILES) from the first hard disk 20 to a master file in the second hard disk 40 according to the directory information at step S11. The data compressed by the file compress system can be preferably used in order to save the disk space. After the master file is manufactured, the master file is recorded on the CD-ROM disk by the CD-ROM recorder 50. The sizes of I path, M path, ROOT, DIR ENTRY & FILES are variable according to the number of files to be stored on the CD-ROM disk.

Figure 3:
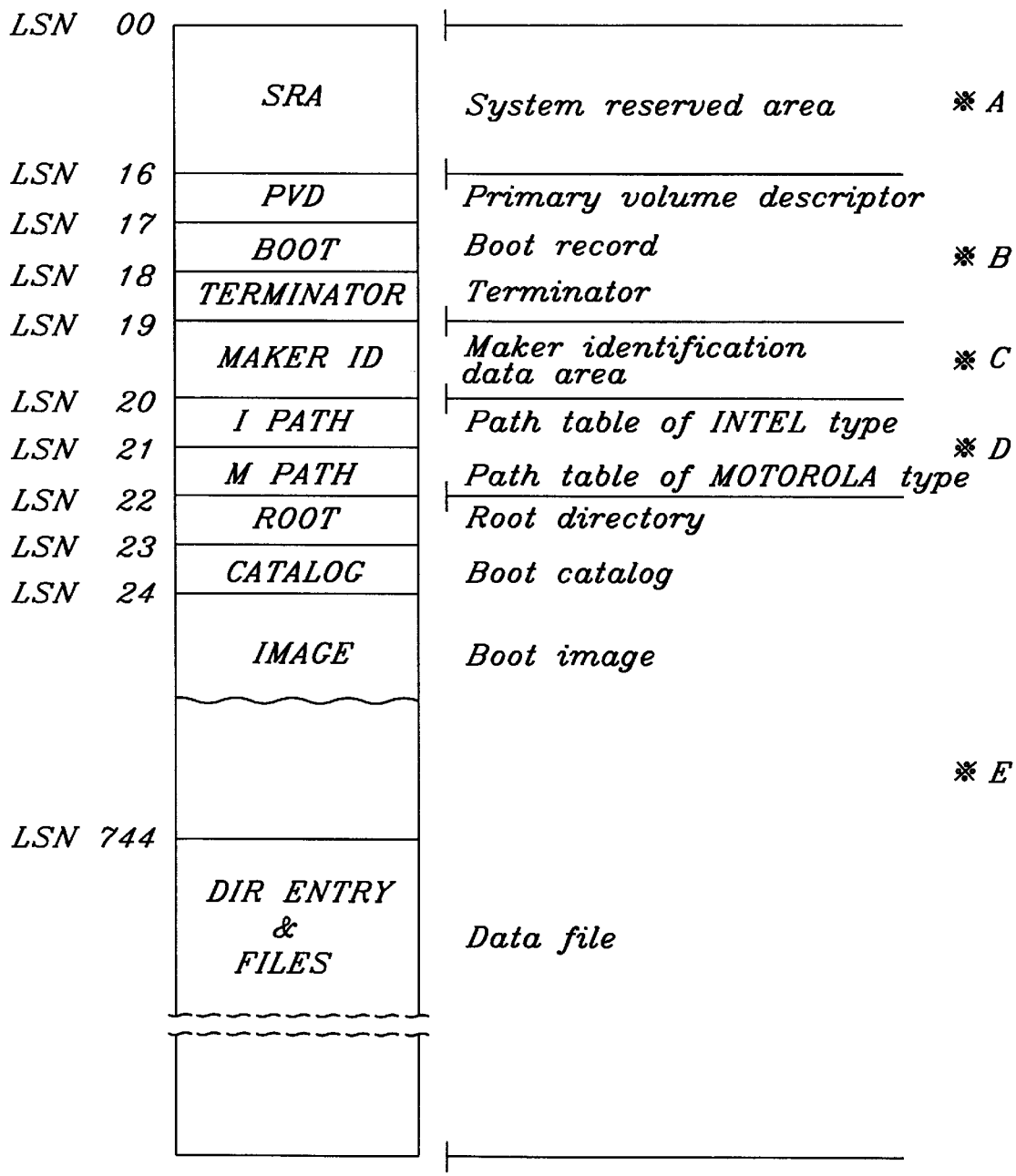
FIG. 3 is a data structure of the CD-ROM manufactured by the manufacturing process of the present invention.

As shown in FIG. 3, the CD-ROM disk manufactured by this invention includes the System Reserved Area, the descriptor table consisting of the PVD, the boot record, and the terminator, and the path table (I path, M path) regarding the directory information. The maker identification data area (MAKER ID) is provided for recording the information regarding system manufacturer. The CD-ROM disk also includes a boot catalog, a root directory, a boot image and plurality of the application programs and the data files (DIR ENTRY & FILES). The wave pattern in the boot image in FIG. 3 shows that the operating system programs of the boot image and the data files are separated by an area on which any program is not recorded.

In order to use the CD-ROM disk of the present invention in a computer system, the computer system should have a ROM BIOS which can boot the computer system with the CD-ROM disk. When the user insert the CD-ROM disk of this invention into the CD-ROM drive, the ROM BIOS boots the computer system after recognizing the booting area (area above the wave pattern in FIG.3) of the CD-ROM disk as 'A' drive. Then the ROM-BIOS recognizes the remaining part (area below the wave pattern in FIG.3) of the CD-ROM disk as 'F' drive (a user can optionally define the name of drive).

The bootable data CD-ROM disk of this invention has many advantageous features. First, a program supplier does not have to produce a plurality of floppy disks in order to provide a program of big size to a consumer, and does not have to provide a separate booting CD-ROM disk and a data CD-ROM disk. Secondly, the cost of providing the various programs to the user is reduced. Thirdly, the user can boot and use computer system with only a CD-ROM disk. Lastly, the user can repair the damaged computer system easily with only the CD-ROM.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A bootable disk manufacturing system, comprising:
    a data source for providing data files to be recorded in a compact disk read-only-memory (CD-ROM) disk;
    a floppy disk providing an operating system comprising a booting process and one of a program and a plurality of programs to be executed with the booting process;
    a computer producing a master file by arranging the data files so as to be separated from the operating system and each program to be executed with the booting process by an area on which any program is not recorded and on which any data is not recorded;
    a master hard disk storing the master file; and
    a disk recorder recording the master file in the compact disk read-only-memory (CD-ROM) disk under control of the computer.

2. The bootable disk manufacturing system of claim 1, further comprised of said data source corresponding to a device selected from the group consisting of a hard disk, a compact disk read-only-memory (CD-ROM) disk, and any other computer system connected to the computer by a network.

3. The bootable disk manufacturing system of claim 1, further comprised of said compact disk read-only-memory (CD-ROM) disk comprising:
    a system reserved area;
    a descriptor table area including a boot record;
    a path table area for recording directory information of the compact disk read-only-memory (CD-ROM) disk;
    a booting catalog area including a validation entry and booting information;
    a root directory area for recording information regarding files recorded on the compact disk read-only-memory (CD-ROM) disk;

a boot image area having a predetermined size and for recording one of a booting program and a plurality of booting programs; and an area for recording application programs and data files, the area for recording application programs and data files being separated from each booting program in the boot image area by the area on which any program is not recorded and on which any data is not recorded.

4. The bootable disk manufacturing system of claim 3, further comprised of said compact disk read-only-memory (CD-ROM) disk comprising a maker identification data area for recording information of a system manufacturer.

5. The bootable disk manufacturing system of claim 4, further comprised of the boot image area including a boot image file, the boot image file including at least one program from said floppy disk for booting a computer.

6. The bootable disk manufacturing system of claim 3, further comprised of the predetermined size of the boot image area being 2.88 MB.

7. The bootable disk manufacturing system of claim 6, further comprised of a portion of the boot image area being reserved for the area on which any program is not recorded and on which any data is not recorded that separates each booting program from the area for recording application programs and data files.

8. The bootable disk manufacturing system of claim 3, further comprised of a portion of the boot image area being reserved for the area on which any program is not recorded and on which any data is not recorded that separates each booting program from the area for recording application programs and data files.

9. The bootable disk manufacturing system of claim 1, further comprised of the area on which any program is not recorded and on which any data is not recorded being a portion of the master file reserved for the operating system and each program to be executed with the booting process.

10. A method of manufacturing a bootable compact disk read-only-memory (CD-ROM) disk, comprising the steps of:

making boot catalog information with a validation entry and information for a booting process;

making a boot image file by reading a floppy disk recording one of a booting program and a plurality of booting programs;

making a tree file by analyzing structures of a directory and each data file recorded in a data source;

determining sizes of files in the directory and storing temporarily the sizes of the files in the tree file;

determining a logical sector number for path table information of each booting program, each data file of the data source, and the directory;

making a system reserved area for a compact disk read-only-memory (CD-ROM) disk;

making a descriptor table including a boot record;

making a path table according to the path table information;

making a master file on a master hard disk by copying the boot image file and each data file of the data source according to the directory information of the tree file so that the boot image file is separated from each data file of the data source by an area on which any program is not recorded and on which any data is not recorded; and recording the master file on the compact disk read-only-memory (CD-ROM) disk.

11. The method of claim 10, further comprised of said boot image file including an area recorded with each booting program and including a blank area.

12. The method of claim 11, further comprised of the boot image file including at least one program from said floppy disk for booting a computer.

13. The method of claim 5, further comprised of an area for the boot image file including the area on which any program is not recorded and on which any data is not recorded so as to separate the boot image file from each data file of the data source.

14. A bootable compact disk read-only-memory (CD-ROM) disk for booting a computer system, comprising:

a system reserved area;

a descriptor table area including a boot record;

a path table area for recording directory information of the compact disk read-only-memory (CD-ROM) disk;

a booting catalog area including a validation entry and booting information;

a root directory area for recording information regarding files recorded on the compact disk read-only-memory (CD-ROM) disk;

a boot image area having a predetermined size and for recording one of a booting program and a plurality of booting programs; and an area for recording application programs and data files, the area for recording application programs and data files being separated from each booting program in the boot image area by an area on which any program is not recorded and on which any data is not recorded.

15. The bootable compact disk read-only-memory (CD-ROM) disk of claim 7, further comprising a maker identification data area for recording information of a system manufacturer.

16. The bootable compact disk read-only-memory (CD-ROM) disk of claim 7, further comprised of the boot image area including the area on which any program is not recorded and on which any data is not recorded so as to separate each booting program in the boot image area from the area for recording application programs and data files.

17. The bootable compact disk read-only-memory (CD-ROM) disk of claim 14, further comprised of the predetermined size of the boot image area being 2.88 MB.

18. The bootable compact disk read-only-memory (CD-ROM) disk of claim 14, further comprised of the boot image area including the area on which any program is not recorded and on which any data is not recorded so as to separate each booting program in the boot image area from the area for recording application programs and data files.

19. The bootable compact disk read-only-memory (CD-ROM) disk of claim 7, further comprised of the boot image area including a boot image file, the boot image file including at least one program from a floppy disk for booting a computer system.

* * * * *